United States Patent
Lin

(10) Patent No.: US 12,493,202 B2
(45) Date of Patent: Dec. 9, 2025

(54) SPECIAL LENS AND GLASSES FOR SPORTS SCENE

(71) Applicant: Globalwinson Technology (ZhuHai) Co., Ltd., Zhuhai (CN)

(72) Inventor: Manli Lin, Zhuhai (CN)

(73) Assignee: Globalwinson Technology (ZhuHai) Co., Ltd., Zhuhai (CN)

( * ) Notice: Subject to any disclaimer, the term of this patent is extended or adjusted under 35 U.S.C. 154(b) by 631 days.

(21) Appl. No.: 17/951,131

(22) Filed: Sep. 23, 2022

(65) Prior Publication Data

US 2024/0036358 A1 Feb. 1, 2024

(30) Foreign Application Priority Data

Aug. 1, 2022 (CN) .......................... 202222014446.2

(51) Int. Cl.
*G02C 7/10* (2006.01)
*B29D 11/00* (2006.01)
(Continued)

(52) U.S. Cl.
CPC ........ *G02C 7/108* (2013.01); *B29D 11/00903* (2013.01); *G02B 1/041* (2013.01);
(Continued)

(58) Field of Classification Search
CPC .... G02C 7/108; G02C 2202/16; G02C 7/104; G02C 7/022; G02C 7/107; G02C 7/102; G02C 7/10; B29D 11/00903; B29D 11/00009; B29D 11/00634; B29D 11/0073; B29D 11/00913; G02B 1/041; G02B 1/11; G02B 1/12; G02B 1/14; G02B 1/18; G02B 3/0062; G02B 5/003; G02B 5/223;
(Continued)

(56) References Cited

U.S. PATENT DOCUMENTS 11,464,678 B1 * 10/2022 Lee ....................... G02B 5/0833
2017/0235160 A1 * 8/2017 Larson ................... G02C 7/104
351/45

(Continued)

FOREIGN PATENT DOCUMENTS

CN 112592573 A * 4/2021 ........... C08K 5/0041
WO WO-2022252038 A1 * 12/2022

*Primary Examiner* — William R Alexander
*Assistant Examiner* — Matthew Y Lee

(57) ABSTRACT

The invention discloses a special lens for sports scenes. The lens body has a blue-green absorption layer, an auxiliary absorption layer and a green-red absorption layer. The blue-green absorption layer, the auxiliary absorption layer and the green-red absorption layer are pasted together by glue or fixed together by hot-melt pressing process. The blue-green absorption layer is injection-molded by adding 1.2 g of blue light absorber and 1.04 g of phthalocyanine dye per 100 g of substrate material. The auxiliary absorption layer is injection-molded by adding 2.4 g of phthalocyanine dye and 2.4 g of azo nickel metal compound per 100 g of the substrate material. The green-red absorption layer is injection-molded by adding 1.04 g of azo nickel metal compound and 1.2 g of blue light absorber per 100 g of the substrate material. The invention makes the blue and green colors of the object more vivid and improves the contrast and clarity of the color of the object.

14 Claims, 1 Drawing Sheet

(51) Int. Cl.
*G02B 1/04* (2006.01)
*G02B 1/11* (2015.01)
*G02B 1/12* (2006.01)
*G02B 1/14* (2015.01)
*G02B 1/18* (2015.01)
*B29K 105/00* (2006.01)
*B29L 11/00* (2006.01)

(52) U.S. Cl.
CPC ................. *G02B 1/11* (2013.01); *G02B 1/12* (2013.01); *G02B 1/14* (2015.01); *G02B 1/18* (2015.01); *B29K 2105/0032* (2013.01); *B29L 2011/0016* (2013.01)

(58) Field of Classification Search
CPC . G02B 1/115; G02B 1/04; G02B 1/10; B29K 2105/0032; B29L 2011/0016
See application file for complete search history.

(56) References Cited

U.S. PATENT DOCUMENTS

| | | | |
|---|---|---|---|
| 2017/0315384 A1* | 11/2017 | Saylor | G02C 7/101 |
| 2019/0235282 A1* | 8/2019 | Coppa | B29D 11/00634 |
| 2020/0298440 A1* | 9/2020 | Aoto | B41J 2/442 |
| 2024/0019717 A1* | 1/2024 | French | G02C 7/102 |

* cited by examiner

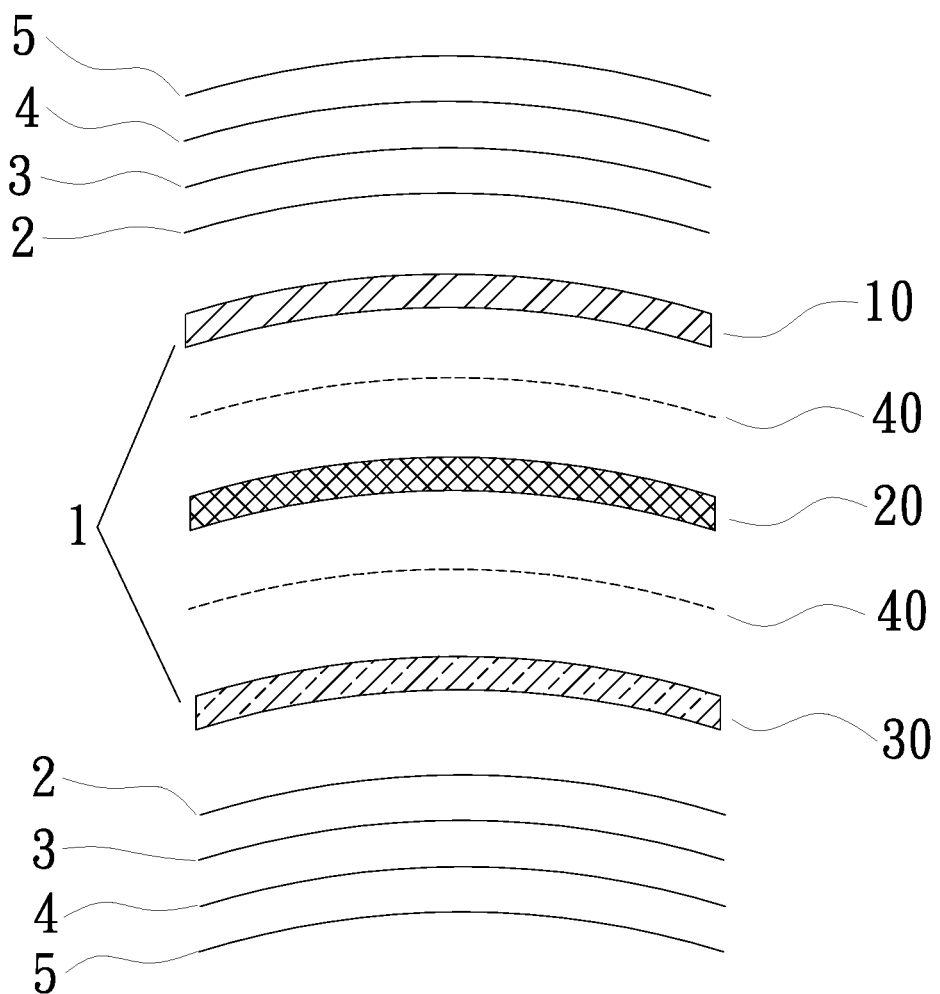

SPECIAL LENS AND GLASSES FOR SPORTS SCENE

CROSS-REFERENCE TO RELATED APPLICATION

This application is a continuation of pending Patent Application Serial No. 202222014446.2, filed Aug. 1, 2022 at China National Intellectual Property Administration, the contents of the applications are hereby incorporated by reference in their entirety.

FIELD OF THE INVENTION

The present invention relates to the technical field of lenses, and more particularly to a special lens for sports scenes and glasses using the special lens.

BACKGROUND OF THE INVENTION

In some specific open scenes, such as golf courses, grasslands, snow and sea, there are transitional junction in color in the environment, such as the blue-green junction between the blue sky and the green lawn, and the green-red junction between green lawn and red boundary stakes, etc. The extreme changes in color in these scenes distract the eyes from paying attention to the color of the target object, resulting in a decrease in the perception ability of the cone cell function. Thus, the color contrast of the object within the line of sight is low, and the color becomes lighter when you look at a certain color. For example, red becomes pinkish and green becomes grassy green, which is not conducive to accurate observation. For golfers, they urgently need to highly recognize the edges of objects when playing golf on the golf course, so that the blue and green colors are more vivid and what is seen is clearer. Therefore, based on the rich experience and professional knowledge accumulated in the lens industry for a long time, the inventor of the present invention has developed a kind of spectacle lens specially suitable for specific sports scenes with theoretical analysis and research and innovation, so as to make the color of the object to be viewed more uniform and improve the contrast and clarity of the color of the object. Thus, the present invention is developed.

SUMMARY OF THE INVENTION

One objective of the present invention is to provide a special lens for sports scenes, which can make the blue and green colors of the object more vivid, and improve the contrast and clarity of the color of the object.

In order to achieve the above-mentioned objective, the solution of the present invention is:

A special lens for sports scenes includes a lens body. The lens body has a blue-green absorption layer, an auxiliary absorption layer and a green-red absorption layer. The blue-green absorption layer, the auxiliary absorption layer and the green-red absorption layer are pasted together by glue or fixed together by hot-melt pressing process. The blue-green absorption layer is injection-molded by adding 1.2 g of blue light absorber and 1.04 g of phthalocyanine dye per 100 g of substrate material. The auxiliary absorption layer is injection-molded by adding 2.4 g of phthalocyanine dye and 2.4 g of azo nickel metal compound per 100 g of the substrate material. The green-red absorption layer is injection-molded by adding 1.04 g of azo nickel metal compound and 1.2 g of blue light absorber per 100 g of the substrate material.

In an embodiment of the present invention, the substrate material is PC, PA or nylon.

In an embodiment of the present invention, a thickness of the blue-green absorption layer is 0.5 to 1.5 mm, a thickness of the auxiliary absorption layer is 0.5 to 1.0 mm, and a thickness of the green-red absorption layer is 0.5 to 1.0 mm.

In an embodiment of the present invention, a surface of the lens body is further provided with a hardening layer, an anti-reflection layer, a waterproof layer and an oil-proof layer.

In an embodiment of the present invention, the glue is UV glue.

A fabrication method of a special lens for sports scenes, including steps of:

the first step, a fabrication of the blue-green absorption layer: adding 1.2 g of blue light absorber and 1.04 g of phthalocyanine dye per 100 g of the substrate material to form the blue-green absorption layer by injection molding, wherein the thickness of the blue-green absorption layer is 0.5 to 1.5 mm, a fabrication of the auxiliary absorption layer: adding 2.4 g of phthalocyanine dye and 2.4 g of azo nickel metal compound per 100 g of the substrate material to form the auxiliary absorption layer by injection molding, wherein the thickness of the auxiliary absorption layer is 0.5 to 1.0 mm, and a fabrication of the green-red absorption layer: adding 1.04 g of azo nickel metal compound and 1.2 g of blue light absorber per 100 g of the substrate material to form the green-red absorption layer by injection molding, wherein the thickness of the green-red absorption layer is 0.5 to 1.0 mm;

the second step, a fabrication of the lens body: pasting and fixing the blue-green absorption layer, the auxiliary absorption layer and the green-red absorption layer fabricated in the first step together by glue to form the lens body, or fixing the blue-green absorption layer, the auxiliary absorption layer and the green-red absorption layer fabricated in the first step together by hot-melt pressing process to form the lens body; and the third step, cleaning the lens body fabricated in the second step, performing a surface hardening process to form a hardening layer and drying it to obtain a finished product.

In an embodiment of the present invention, in the first step, the substrate material and each additive material are mixed and stirred for 40 minutes, then put into a granulator, then put into a dehumidifying dryer at 120° C. for 4 hours after granulation is completed, then put into a three-color injection molding machine to melt at a temperature of 270 to 280° C., and injected into a lens mold for molding to form the blue-green absorption layer, the auxiliary absorption layer and the green-red absorption layer.

In an embodiment of the present invention, after the third step, the surface of the lens is treated with an anti-reflection treatment, a waterproof treatment and an oil-proof treatment.

The present invention further provides a pair of special glasses for sports scenes, and lenses of the pair of special glasses for sports scenes adopt the aforementioned special lens for sports scenes.

After adopting the above solution, the present invention can absorb 480 to 510 nm light at the junction of blue light and green light through the blue-green absorption layer and can absorb 570 to 600 nm light at the junction of green light and red light through the green-red absorption layer. The auxiliary absorption layer uses the same dyes and chemical additives as the blue-green absorption layer and the green-red absorption layer, which can make the subsequent lens gluing or hot-melt pressing smoother, reduce resistance, and add dyes dispersedly to increase the light transmittance of the lens. At the same time, the thickness of the lens body can be increased or decreased as required. Thus, the transmittance of the present invention is 0-7% for the light in the 480 to 510 nm band and 0-8% for the light in the 570 to 600 nm band, which reduces the impact of light at the junction of blue light and green light and the junction of green light and red light on normal vision, makes the blue and green colors of the object more vivid, improves the contrast and clarity of the object color, greatly blocks the impact of light at the junction of blue-green and green-red on normal vision, enhances the color of the target and its prominence in the environment and shows the best visual effect.

BRIEF DESCRIPTION OF THE DRAWING

The present invention will become more readily apparent to those ordinarily skilled in the art after reviewing the following detailed description and accompanying drawings, in which:

FIGURE is a schematic view of the structure of the lens of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

In order to make golfers and other groups of people in some specific scenes not affected by the color of the transitional junction area in the environment, the blue and green colors to be watched more vivid, the things to be seen clearer, and object edge analyzed the more accurate, the present invention specifically provides a special lens for sports scenes.

As shown in the FIGURE, the present invention is mainly about adding a coloring agent to the raw material for injection molding of the substrate. Specifically, the present invention discloses a special lens for sports scenes. The lens body 1 has a blue-green absorption layer 10, an auxiliary absorption layer 20 and a green-red absorption layer 30. The blue-green absorption layer 10, the auxiliary absorption layer 20 and the green-red absorption layer 30 are pasted and fixed together by glue 40, wherein the glue 40 is preferably UV glue. Or, the blue-green absorption layer 10, the auxiliary absorption layer 20 and the green-red absorption layer 30 can also be fixed together by the hot-melt pressing process instead of the glue 40.

In one embodiment, the blue-green absorption layer 10 is injection-molded by adding 1.2 g of blue light absorber and 1.04 g of phthalocyanine dye per 100 g of substrate material.

In one embodiment, the auxiliary absorption layer 20 is injection-molded by adding 2.4 g of phthalocyanine dye and 2.4 g of azo nickel metal compound per 100 g of substrate material.

In one embodiment, the green-red absorption layer 30 is injection-molded by adding 1.04 g of azo nickel metal compound and 1.2 g of blue light absorber per 100 g of substrate material.

The substrate material is PC (e.g., polycarbonate plastic rice from Mitsubishi Corporation of Japan), PA or nylon. The substrates of the blue-green absorption layer 10, the auxiliary absorption layer 20 and the green-red absorption layer 30 can be selected from the same material, which is more suitable for the hot-melt pressing process to fix the blue-green absorption layer 10, the auxiliary absorption layer 20 and the green-red absorption layer 30 together.

In order to enhance the hardness, the waterproof and oil-proof performance of the lens surface and the light transmittance of the lens, the present invention further provides a hardening layer 2, an anti-reflection layer 3, a waterproof layer 4 and an oil-proof layer 5 on the surface of the lens body 1 in sequence, thereby obtaining the special lens suitable for sports scenes of the present invention.

The fabrication method of the special lens for sports scenes of the present invention are as follows.

The first step is to fabricate the blue-green absorption layer 10, the auxiliary absorption layer 20 and the green-red absorption layer 30.

The fabrication of the blue-green absorption layer 10: adding 1.2 g of blue light absorber and 1.04 g of phthalocyanine dye per 100 g of the substrate material to form the blue-green absorption layer 10 by injection molding. The thickness of the blue-green absorption layer 10 is 0.5 to 1.5 mm.

The fabrication of the auxiliary absorption layer 20: adding 2.4 g of phthalocyanine dye and 2.4 g of azo nickel metal compound per 100 g of the substrate material to form the auxiliary absorption layer 20 by injection molding. The thickness of the auxiliary absorption layer 20 is 0.5 to 1.0 mm.

The fabrication of the green-red absorption layer 30: adding 1.04 g of azo nickel metal compound and 1.2 g of blue light absorber per 100 g of the substrate material to form the green-red absorption layer 30 by injection molding. The thickness of the green-red absorption layer 30 is 0.5 to 1.0 mm.

In the first step, the substrate material of each layer and the corresponding additive materials can be mixed and stirred for 40 minutes, then put into a granulator, then put into a dehumidifying dryer at 120° C. for 4 hours after granulation is completed, then put into a three-color injection molding machine to melt at a temperature of 270 to 280° C., and then injected into a lens mold for molding to form the blue-green absorption layer 10, the auxiliary absorption layer 20 and the green-red absorption layer 30.

The second step is to fabricate the lens body 1.

In one embodiment, the blue-green absorption layer 10, the auxiliary absorption layer 20 and the green-red absorption layer 30 fabricated in the first step are pasted and fixed together by glue 40 to form the lens body 1.

In another embodiment, the blue-green absorption layer 10, the auxiliary absorption layer 20 and the green-red absorption layer 30 fabricated in the first step are fixed together by hot-melt pressing process to form the lens body 1.

The third step is to obtain a finished product by cleaning the lens body 1 fabricated in the second step, performing a surface hardening process to form a hardening layer 2 and drying it.

After the third step, the surface of the lens can be further treated with an anti-reflection treatment, a waterproof treatment and an oil-proof treatment to form the anti-reflection layer 3, the waterproof layer 4 and the oil-proof layer 5 in sequence.

The present invention fabricates five samples (five examples (i.e., Embodiments 1-5)) according to the aforementioned fabrication method and also fabricates three comparative examples (i.e., Comparative Examples 1-3). Comparative Example 1 is a one-layer structure. Comparative Example 1 directly adds 2.4 g of blue light absorber, 3.44 g of phthalocyanine dye and 3.44 g of azo nickel metal compound per 100 g of substrate material, then mixes and stirs them for 40 minutes, then put them into a granulator, then put them into a dehumidifying dryer at 120° C. for 4 hours after granulation is completed, then put them into a three-color injection molding machine to melt at a temperature of 270 to 280° C., and then injects them into a lens mold for molding to form the sample (Comparative Example 1). Comparative Example 2 is a two-layer structure. Comparative Example 2 adds 1.04 g of azo nickel metal compound and 1.2 g of blue light absorber per 100 g of substrate material of the first layer and adds 1.04 g of phthalocyanine dye and 1.2 g of blue light absorber per 100 g of substrate material of the second layer, then mixes and stirs the materials of the two layers for 40 minutes, then put them into a granulator, then put them into a dehumidifying dryer at 120° C. for 4 hours after granulation is completed, then put them into a three-color injection molding machine to melt at a temperature of 270 to 280° C., and then injects them into a lens mold for molding to form the two layers, and then pastes and fixes them by glue 40 to form the sample (Comparative Example 2). Comparative Example 3 is also a two-layer structure. Comparative Example 3 adds 3.44 g of azo nickel metal compound and 1.2 g of blue light absorber per 100 g of substrate material of the first layer and adds 3.44 g of phthalocyanine dye and 1.2 g of blue light absorber per 100 g of substrate material of the second layer, then mixes and stirs the materials of the two layers for 40 minutes, then put them into a granulator, then put them into a dehumidifying dryer at 120° C. for 4 hours after granulation is completed, then put them into a three-color injection molding machine to melt at a temperature of 270 to 280° C., and then injects them into a lens mold for molding to form the two layers, and then pastes and fixes them by glue 40 to form the sample (Comparative Example 3).

The present invention tests the above-mentioned Examples 1-5 and Comparative Examples 1-3, which are listed in Table 1.

It can be seen from Table 1 that when the one-layer structure is used for injection molding in Comparative Example 1, the absorbed wavelengths of the blue-green junction and the green-red junction are less than those of the three-layer structure, and the overall light transmittance is not as good as that of the three-layer structure. When the two-layer structure (without the middle auxiliary layer) is used for injection molding in Comparative Example 2, the transmittance of the absorption band is better than that of the one-layer structure, but not as good as that of the three-layer structure. In Comparative Example 3, after adding the phthalocyanine dye and azo nickel metal compound of the auxiliary layer to the blue-green absorption layer and the green-red absorption layer respectively, the effect is better than that of Comparative Example 2, but not as good as Examples 1-5. To sum up, the fabrication method in the above-described manner can achieve the final desired effect.

In addition, the present invention directly adds a coloring agent to the raw materials for injection molding of the substrate, so that the obtained lens has a transmittance of 0-7% for the light in the 480 nm-510 nm band, and a transmittance of 0-8% for the light in the 570 nm-600 nm band. Thus, compared with the conventional multi-layer composite structure, the processing technology of the present invention is simpler, can better block the impact of light at the junction of blue-green and green-red on normal vision, and can show the best visual effect.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A special lens for sports scenes, comprising a lens body, wherein the lens body has a blue-green absorption layer, an auxiliary absorption layer and a green-red absorption layer, the blue-green absorption layer, the auxiliary absorption layer and the green-red absorption layer are pasted together by glue or fixed together by a hot-melt pressing process, the blue-green absorption layer is injection-molded by adding

TABLE 1

| sample | blue-green absorption layer | | auxiliary absorption layer | green-red absorption layer | | in conclusion | |
|---|---|---|---|---|---|---|---|
| | absorption band | transmittance | Light transmittance | absorption band | transmittance | Contrast | Overall light transmittance |
| Example 1 | 480 nm-510 nm | 7% | 97.4% | 570 nm-600 nm | 8% | good | 96.5% |
| Example 2 | 480 nm-510 nm | 7% | 97.6% | 570 nm-600 nm | 5% | good | 94.5% |
| Example 3 | 480 nm-510 nm | 4% | 98.8% | 570 nm-600 nm | 2% | good | 95.6% |
| Example 4 | 480 nm-510 nm | 3% | 98.6% | 570 nm-600 nm | 6% | good | 97.3% |
| Example 5 | 480 nm-510 nm | 6% | 96.9% | 570 nm-600 nm | 8% | good | 95.1% |
| Comparative Example 1 | 480 nm-510 nm | 17% | / | 480 nm-510 nm | 19% | bad | 69.2% |
| Comparative Example 2 | 480 nm-510 nm | 15% | / | 480 nm-510 nm | 14% | bad | 69.9% |
| Comparative Example 3 | 480 nm-510 nm | 12% | / | 480 nm-510 nm | 11% | Not bad | 74.4% |

1.2 g of blue light absorber and 1.04 g of phthalocyanine dye per 100 g of substrate material, the auxiliary absorption layer is injection-molded by adding 2.4 g of phthalocyanine dye and 2.4 g of azo nickel metal compound per 100 g of the substrate material, and the green-red absorption layer is injection-molded by adding 1.04 g of azo nickel metal compound and 1.2 g of blue light absorber per 100 g of the substrate material;
  wherein a method for fabricating the special lens for sports scenes comprises steps of:
  a first step for fabricating the blue-green absorption layer, the auxiliary absorption layer and the green-red absorption layer specifically comprising:
    adding 1.2 g of blue light absorber and 1.04 g of phthalocyanine dye per 100 g of the substrate material to form the blue-green absorption layer by injection molding, wherein the thickness of the blue-green absorption layer is 0.5 to 1.5 mm,
    adding 2.4 g of phthalocyanine dye and 2.4 g of azo nickel metal compound per 100 g of the substrate material to form the auxiliary absorption layer by injection molding, wherein the thickness of the auxiliary absorption layer is 0.5 to 1.0 mm, and
    adding 1.04 g of azo nickel metal compound and 1.2 g of blue light absorber per 100 g of the substrate material to form the green-red absorption layer by injection molding, wherein the thickness of the green-red absorption layer is 0.5 to 1.0 mm;
  a second step for fabricating the lens body specifically comprising:
    pasting and fixing the blue-green absorption layer, the auxiliary absorption layer and the green-red absorption layer fabricated in the first step together by glue to form the lens body, or fixing the blue-green absorption layer, the auxiliary absorption layer and the green-red absorption layer fabricated in the first step together by hot-melt pressing process to form the lens body; and
  a third step specifically comprising:
    cleaning the lens body fabricated in the second step, performing a surface hardening process to form a hardening layer and drying the lens body to obtain a finished product.

2. The special lens for sports scenes according to claim 1, wherein the substrate material is PC, PA or nylon.

3. The special lens for sports scenes according to claim 1, wherein a thickness of the blue-green absorption layer is 0.5 to 1.5 mm, a thickness of the auxiliary absorption layer is 0.5 to 1.0 mm, and a thickness of the green-red absorption layer is 0.5 to 1.0 mm.

4. The special lens for sports scenes according to claim 1, wherein a surface of the lens body is further provided with a hardening layer, an anti-reflection layer, a waterproof layer and an oil-proof layer.

5. The special lens for sports scenes according to claim 1, wherein the glue is UV glue.

6. The special lens for sports scenes according to claim 1, wherein in the first step, the substrate material and each additive material are mixed and stirred for 40 minutes, then put into a granulator, then put into a dehumidifying dryer at 120° C. for 4 hours after granulation is completed, then put into a three-color injection molding machine to melt at a temperature of 270° C. to 280° C., and then injected into a lens mold for molding to form the blue-green absorption layer, the auxiliary absorption layer and the green-red absorption layer.

7. The special lens for sports scenes according to claim 1, wherein after the third step, the surface of the lens is treated with an anti-reflection treatment, a waterproof treatment and an oil-proof treatment.

8. Special glasses for sports scenes, wherein a lens of the special glasses for sports scenes adopts a special lens for sports scenes, the special lens for sports scenes, comprises a lens body, the lens body has a blue-green absorption layer, an auxiliary absorption layer and a green-red absorption layer, the blue-green absorption layer, the auxiliary absorption layer and the green-red absorption layer are pasted together by glue or fixed together by a hot-melt pressing process, the blue-green absorption layer is injection-molded by adding 1.2 g of blue light absorber and 1.04 g of phthalocyanine dye per 100 g of substrate material, the auxiliary absorption layer is injection-molded by adding 2.4 g of phthalocyanine dye and 2.4 g of azo nickel metal compound per 100 g of the substrate material, and the green-red absorption layer is injection-molded by adding 1.04 g of azo nickel metal compound and 1.2 g of blue light absorber per 100 g of the substrate material;
  wherein a method for fabricating the special lens for sports scenes comprises steps of:
  a first step for fabricating the blue-green absorption layer, the auxiliary absorption layer and the green-red absorption layer specifically comprising:
    adding 1.2 g of blue light absorber and 1.04 g of phthalocyanine dye per 100 g of the substrate material to form the blue-green absorption layer by injection molding, wherein the thickness of the blue-green absorption layer is 0.5 to 1.5 mm,
    adding 2.4 g of phthalocyanine dye and 2.4 g of azo nickel metal compound per 100 g of the substrate material to form the auxiliary absorption layer by injection molding, wherein the thickness of the auxiliary absorption layer is 0.5 to 1.0 mm, and
    adding 1.04 g of azo nickel metal compound and 1.2 g of blue light absorber per 100 g of the substrate material to form the green-red absorption layer by injection molding, wherein the thickness of the green-red absorption layer is 0.5 to 1.0 mm;
  a second step for fabricating the lens body specifically comprising:
    pasting and fixing the blue-green absorption layer, the auxiliary absorption layer and the green-red absorption layer fabricated in the first step together by glue to form the lens body, or fixing the blue-green absorption layer, the auxiliary absorption layer and the green-red absorption layer fabricated in the first step together by hot-melt pressing process to form the lens body; and
  a third step specifically comprising:
    cleaning the lens body fabricated in the second step, performing a surface hardening process to form a hardening layer and drying the lens body to obtain a finished product.

9. The special glasses for sports scenes according to claim 8, wherein the substrate material is PC, PA or nylon.

10. The special glasses for sports scenes according to claim 8, wherein a thickness of the blue-green absorption layer is 0.5 to 1.5 mm, a thickness of the auxiliary absorption layer is 0.5 to 1.0 mm, and a thickness of the green-red absorption layer is 0.5 to 1.0 mm.

11. The special glasses for sports scenes according to claim 8, wherein a surface of the lens body is further provided with a hardening layer, an anti-reflection layer, a waterproof layer and an oil-proof layer.

12. The special glasses for sports scenes according to claim 8, wherein the glue is UV glue.

13. The special glasses for sports scenes according to claim 8, wherein in the first step, the substrate material and each additive material are mixed and stirred for 40 minutes, then put into a granulator, then put into a dehumidifying dryer at 120° C. for 4 hours after granulation is completed, then put into a three-color injection molding machine to melt at a temperature of 270° C. to 280° C., and then injected into a lens mold for molding to form the blue-green absorption layer, the auxiliary absorption layer and the green-red absorption layer.

14. The special glasses for sports scenes according to claim 8, wherein after the third step, the surface of the lens is treated with an anti-reflection treatment, a waterproof treatment and an oil-proof treatment.

\* \* \* \* \*